(12) United States Patent
Liang et al.

(10) Patent No.: US 11,929,509 B2
(45) Date of Patent: Mar. 12, 2024

(54) METAL LITHIUM METAL, SUPPORTING FRAMEWORK, AND INORGANIC LITHIUM COMPOUND, METHOD FOR PREPARING THE SAME, AND ELECTRODE, BATTERY, BATTERY MODULE, BATTERY PACK AND APPARATUS COMPRISING THE SAME

(71) Applicant: Contemporary Amperex Technology Co., Limited, Ningde (CN)

(72) Inventors: Chengdu Liang, Ningde (CN); Yongsheng Guo, Ningde (CN); Tao Zhang, Ningde (CN); Chengyong Liu, Ningde (CN); Jun Yang, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 80 days.

(21) Appl. No.: 17/561,748

(22) Filed: Dec. 24, 2021

(65) Prior Publication Data
US 2022/0123320 A1    Apr. 21, 2022

Related U.S. Application Data

(63) Continuation of application No. PCT/CN2020/116308, filed on Sep. 18, 2020.

(30) Foreign Application Priority Data

Oct. 24, 2019   (CN) .......................... 201911014994.1

(51) Int. Cl.
| | |
|---|---|
| *H01M 4/62* | (2006.01) |
| *B22F 1/145* | (2022.01) |
| *H01M 4/38* | (2006.01) |
| *H01M 10/0525* | (2010.01) |

(52) U.S. Cl.
CPC ............. *H01M 4/626* (2013.01); *B22F 1/145* (2022.01); *H01M 4/382* (2013.01);
(Continued)

(58) Field of Classification Search
CPC ........ H01M 4/626; H01M 4/382; B22F 1/145
(Continued)

(56) References Cited

U.S. PATENT DOCUMENTS

| | | | |
|---|---|---|---|
| 2010/0156353 A1 | 6/2010 | Iyer et al. | |
| 2015/0318544 A1* | 11/2015 | Yu ..................... | H01M 10/0525 427/215 |
| 2017/0149051 A1* | 5/2017 | Fujita ................... | H01M 4/525 |

FOREIGN PATENT DOCUMENTS

| | | |
|---|---|---|
| CN | 103972470 A | 8/2014 |
| CN | 108281612 A | 7/2018 |

(Continued)

OTHER PUBLICATIONS

"alloy." In A Dictionary of Chemistry, edited by Law, Jonathan, and Richard Rennie. : Oxford University Press, 2020. https://www.oxfordreference.com/view/10.1093/acref/9780198841227.001.0001/acref-9780198841227-e-170. (Year: 2020).*

(Continued)

*Primary Examiner* — Sean P Cullen
(74) *Attorney, Agent, or Firm* — East IP P.C.

(57) ABSTRACT

Disclosed are a lithium metal composite electrode material for a lithium metal battery, a preparation method for the same, and an electrode, battery, battery module, battery pack and apparatus comprising the same. The lithium metal composite electrode material comprises: lithium metal particles and a lithium-containing conductive layer serving as a supporting framework, the supporting framework being filled with the lithium metal particles; wherein the lithium-containing conductive layer comprises an inorganic lithium compound and a lithium alloy. The lithium metal composite electrode material can solve the problems that, when lithium metal is used as a negative electrode, the electrolyte is easily consumed, and lithium dendrites are easily produced, deposited and dissolved to change electrode thickness, which in (Continued)

turn affects the cycle stability, electrical performance and structural stability of the battery, so as to achieve the purpose of improving the structural stability and cycle stability of the lithium metal electrode.

13 Claims, 8 Drawing Sheets

(52) U.S. Cl.
CPC ... *H01M 10/0525* (2013.01); *B22F 2301/054* (2013.01); *H01M 2220/20* (2013.01)

(58) Field of Classification Search
USPC ... 429/219, 229, 231.1, 231.4, 231.6, 231.8, 429/231.95
See application file for complete search history.

(56) References Cited

FOREIGN PATENT DOCUMENTS

| | | |
|---|---|---|
| CN | 108365169 A | 8/2018 |
| CN | 109088051 A | 12/2018 |
| CN | 109638235 A | 4/2019 |
| CN | 109841817 A | 6/2019 |
| CN | 110098378 A | 8/2019 |
| CN | 110112417 A | 8/2019 |
| CN | 110120502 A | 8/2019 |
| EP | 0281352 A2 | 9/1988 |
| WO | 2008157067 A1 | 12/2008 |
| WO | WO-2017193778 A1 * | 11/2017 .......... H01M 10/052 |
| WO | 2018169247 A2 | 9/2018 |

OTHER PUBLICATIONS

The extended European search report for European Application No. 20878799.4, dated Jul. 22, 2022, 8 pages.
The Second Office Action for Chinese Application No. 201911014994.1, dated Mar. 17, 2022, 19 pages.
The Rejection Decision for Chinese Application No. 201911014994.1, dated May 18, 2022, 7 pages.
The International search report for PCT Application No. PCT/CN2020/116308, dated Dec. 2, 2020, 15 pages.
The First Office Action for China Application No. 201911014994.1, dated Sep. 24, 2021, 12 pages.

* cited by examiner

METAL LITHIUM METAL, SUPPORTING FRAMEWORK, AND INORGANIC LITHIUM COMPOUND, METHOD FOR PREPARING THE SAME, AND ELECTRODE, BATTERY, BATTERY MODULE, BATTERY PACK AND APPARATUS COMPRISING THE SAME

CROSS-REFERENCE TO RELATED APPLICATION

The present application is a continuation of International Application No. PCT/CN2020/116308, filed on Sep. 18, 2020, which claims priority to Chinese Patent Application 201911014994.1, entitled "LITHIUM METAL COMPOSITE ELECTRODE MATERIAL, METHOD FOR PREPARING THE SAME, AND ELECTRODE, BATTERY, BATTERY MODULE, BATTERY PACK AND APPARATUS COMPRISING THE SAME", filed on Oct. 24, 2019, both of which are incorporated herein by reference in their entireties.

TECHNICAL FIELD

The present application relates to the field of batteries, and in particular, to a lithium metal composite electrode material, a method for preparing the same, and an electrode, battery, battery module, battery pack and apparatus comprising the same.

BACKGROUND

Removable chemical power sources are widely used in modern society. With the continuous development of high and new technology, the requirements for energy density of power supply systems are increasing. Secondary batteries with high energy density have become the focus of future energy industry development. Lithium-ion batteries have become the most commonly used secondary battery systems due to outstanding performance advantages. However, the existing lithium-ion batteries often use graphitized carbon materials as negative electrode materials, with a theoretical specific capacity of 370 mAh/g, so the energy density of related batteries is far from meeting the requirements of modern society. Especially with the rapid development of electric vehicles and the like, secondary batteries with higher specific energy are urgently required.

Lithium metal has the highest theoretical specific capacity of 3860 mAh/g and the lowest electrode potential among solid-phase materials. When a standard hydrogen electrode is taken as the reference, the lowest electrode potential is −3.04V. The development of lithium metal-based secondary batteries with high energy density has become the hotspot of research. However, the lithium metal used as a negative electrode material has three major problems: first, due to the high activity of lithium metal and the unevenness of a solid electrolyte interface film formed on the surface, an irreversible reaction with an electrolyte easily occurs during the cycle, which consumes the electrolyte, reduces the coulombic efficiency, and eventually leads to battery failure. Second, the lithium metal easily forms dendrites during the cycle. The lithium dendrites separated from a substrate cannot form electronic pathways but form "dead lithium", which will reduce the cycle efficiency of a lithium electrode; if the lithium dendrites continue to grow, they will pierce the separator to cause a short circuit and thermal runaway of the battery, and serious thermal runaway of the battery will cause a series of safety issues such as explosion. Third, the deposition and dissolution of the lithium metal involve significant change in electrode thickness, which will affect the stability of a battery structure.

SUMMARY

A first objective of the present application is to provide a lithium metal composite electrode material for a lithium metal battery, to solve the problems that, when lithium metal is used as a negative electrode, the electrolyte is easily consumed, and lithium dendrites are easily produced, deposited and dissolved to change electrode thickness, which in turn affects the cycle stability, electrical performance and structural stability of the battery.

A second objective of the present application is to provide a method for preparing a lithium metal composite electrode material for a lithium metal battery, to solve the problems that, when lithium metal is used as a negative electrode, the electrolyte is easily consumed, and lithium dendrites are easily produced, deposited and dissolved to change electrode thickness, which in turn affects the cycle stability, electrical performance and structural stability of the battery.

A third objective of the present application is to provide a lithium metal composite electrode for a lithium metal battery, including the lithium metal composite electrode material of the present application.

A fourth objective of the present application is to provide a lithium metal battery including the lithium metal composite electrode of the present application.

A fifth objective of the present application is to provide a battery module including the lithium metal battery of the present application.

A sixth objective of the present application is to provide a battery pack including the battery module of the present application.

A seventh objective of the present application is to provide an apparatus including the lithium metal battery of the present application, the lithium metal battery serving as a power source for the apparatus.

To achieve the above objectives, the technical solutions adopted in the present application are as follows:

In a first aspect, the present application provides a lithium metal composite electrode material for a lithium metal battery, including:

lithium metal particles and a lithium-containing conductive layer serving as a supporting framework, the supporting framework being filled with the lithium metal particles; wherein the lithium-containing conductive layer includes an inorganic lithium compound and a lithium alloy. Irreversible reaction between the lithium metal and the electrolyte is reduced, the volume expansion of the lithium metal is inhibited, the growth of lithium dendrites is effectively avoided, and the stability of the electrode structure is improved. The lithium metal composite electrode material provided by the present application can significantly improve the cycle stability and safety of a lithium metal secondary battery.

In any one of the above embodiments, the lithium-containing conductive layer is grown in situ on surfaces of the lithium metal particles. The structural stability of the lithium metal composite electrode material is significantly improved, and the volume change of the lithium metal particles can be effectively inhibited.

In any one of the above embodiments, the inorganic lithium compound includes at least one of lithium nitride, lithium sulfide, or lithium phosphide; the metal in the lithium alloy is at least one selected from Zn, Mg, Ag, Al, Ge, Sn, Sb, In, or Ga. The lithium nitride, lithium sulfide, or lithium phosphide has relatively high ionic conductivity, and can significantly improve the reaction speed of the lithium metal composite electrode material.

In any one of the above embodiments, the lithium-containing conductive layer has a mass percentage of from 10% to 20% in the lithium metal composite electrode material. By limiting the percentage of the lithium-containing conductive layer in the entire lithium metal composite electrode material, the electrical performance of the lithium metal composite electrode material can be optimized, so that the lithium metal composite electrode material has a relatively high specific capacity and a relatively high cycle stability.

In any one of the above embodiments, the lithium-containing conductive layer includes conductive carbon.

Optionally, the conductive carbon includes at least one of carbon nanotubes, carbon fibers, or graphene. The added conductive carbon can not only improve electronic conductivity, but also help improve the mechanical strength of the lithium metal composite electrode material after sheet formation.

Optionally, the conductive carbon has a mass percentage of from 5% to 15% in the lithium metal composite electrode material. By optimizing the mass percentage of conductive carbon in the lithium metal composite electrode material, the conductivity of the lithium metal composite electrode material can be improved, and the lithium-containing conductive layer serving as a supporting framework structure can have a relatively strong structural stability.

In a second aspect, the present application provides a method for preparing a lithium metal composite electrode material for a lithium metal battery, including the following step of:

filling a lithium-containing conductive layer serving as a supporting framework with lithium metal particles, to obtain the lithium metal composite electrode material; wherein the lithium-containing conductive layer includes an inorganic lithium compound and a lithium alloy.

In any of the above embodiments, the lithium-containing conductive layer serving as a supporting framework is grown in situ on surfaces of the lithium metal particles, to obtain the lithium metal composite electrode material.

Optionally, under solvent-free and oxygen-free conditions, the lithium metal particles are brought in contact with a metal compound capable of reacting with lithium, to grow the lithium-containing conductive layer in situ on the surfaces of the lithium metal particles after reaction. In this preparation method, the lithium metal particles are brought in contact with a metal compound capable of reacting with lithium under dry conditions, such as by dry mixing. Through the contact, the lithium metal particles and the metal in the metal compound undergo, for example, a replacement reaction, so that the lithium-containing conductive layer is grown in situ on the surfaces of the lithium metal particles.

Optionally, under solvent-free and oxygen-free conditions, the lithium metal particles and the metal compound are mixed and ground, and then subjected to heat treatment, to grow the lithium-containing conductive layer on the surfaces of the lithium metal particles in situ.

Optionally, the metal compound has a mass percentage of from 20% to 50%, relative to a total mass of the lithium metal particles and the metal compound. By optimizing the addition amount of the metal compound, the electrical performance of the lithium metal composite electrode material can be optimized, so that the lithium metal composite electrode material has a relatively high specific capacity and a relatively high cycle stability.

In any of the above embodiments, the lithium metal particles and the metal compound are first mixed and ground, added with conductive carbon for mixing and grinding, and then subjected to heat treatment, to grow the lithium-containing conductive layer on the surfaces of the lithium metal particles in situ.

Optionally, the conductive carbon has a mass percentage of from 5% to 15% in the lithium metal composite electrode material.

Optionally, after mixing and grinding, pressing into a sheet is carried out first, and then the heat treatment is carried out.

In any of the above embodiments, the metal compound is an inorganic metal compound.

Optionally, the inorganic metal compound includes at least one of metal nitride, metal sulfide, or metal phosphide, and optionally includes at least metal nitride.

Optionally, the metal in the metal compound is at least one selected from Zn, Ag, Al, Ge, Sn, Sb, In, or Ga, and optionally includes at least aluminum.

Optionally, the metal compound has a particle size of from 50 nm to 2 μm, and the lithium metal particles have a particle size of from 1 μm to 50 μm; the particle size of the lithium metal particles is at least two times larger than that of the metal compound, and optionally, the particle size of the lithium metal particles is five times larger than that of the metal compound.

In any of the above embodiments, the heat treatment is carried out at a temperature of from 100° C. to 300° C. for 1 h to 2 h. By optimizing the heat treatment process, the reaction can be fully carried out, and the metal compound can be fully reacted to generate the lithium-containing conductive layer.

Optionally, when the metal compound includes at least aluminum nitride, the heat treatment is carried out at a temperature of from 150° C. to 200° C.

In a third aspect, the present application provides a lithium metal composite electrode for a lithium metal battery, including the lithium metal composite electrode material according to the first aspect of the present application or the lithium metal composite electrode material obtained by the preparation method according to the second aspect of the present application.

In a fourth aspect, the present application provides a lithium metal battery, including the lithium metal composite electrode according to the third aspect of the present application.

In a fifth aspect, the present application provides a battery module, including the lithium metal battery according to the fourth aspect of the present application.

In a sixth aspect, the present application provides a battery pack, including the battery module according to the fifth aspect of the present application.

In a seventh aspect, the present application provides an apparatus using the lithium metal battery as a power source, including the battery pack according to the sixth aspect of the present application.

In any of the above embodiments, the apparatus includes an electric vehicle, a hybrid electric vehicle, a plug-in hybrid electric vehicle, an electric bicycle, an electric scooter, an electric golf cart, an electric truck, an electric ship, or an energy storage system.

Compared with some situations, the advantages of the technical solutions of the present application are:

In the lithium metal composite electrode material provided in the present application, gaps of a lithium-containing conductive layer serving as a supporting framework are filled with lithium metal particles, wherein the lithium-containing conductive layer includes an inorganic lithium compound and a lithium alloy. The lithium-containing conductive layer serves as a three-dimensional supporting framework structure to coat the lithium metal particles, thereby isolating the lithium metal particles from the electrolyte to reduce irreversible reaction between the lithium metal and the electrolyte.

The lithium-containing conductive layer coated on the surfaces of the lithium metal particles can adjust the conduction mechanism of electrons and ions in the lithium metal composite electrode material and the physical environment and chemical environment at the lithium metal interface, effectively reduce the surface activity of the active phase of the lithium metal, and provide sufficient space and active sites for the deposition of lithium metal, thereby inhibiting the generation of lithium dendrites and the volume change of the electrode, and improving the cycle stability and safety of the battery.

The lithium metal composite electrode material provided by the present application can significantly improve the cycle stability and safety of the lithium metal secondary battery.

It should be understood that the above general description and the following detailed description are only exemplary and cannot limit the present application.

DESCRIPTION OF THE DRAWINGS

In order to explain the technical solutions of the embodiments of the present application more clearly, the following will briefly introduce the drawings that need to be used in the embodiments of the present application. Obviously, the drawings described below are only some embodiments of the present application. A person of ordinary skill in the art can obtain other drawings based on the drawings without creative work.

Figure 1:
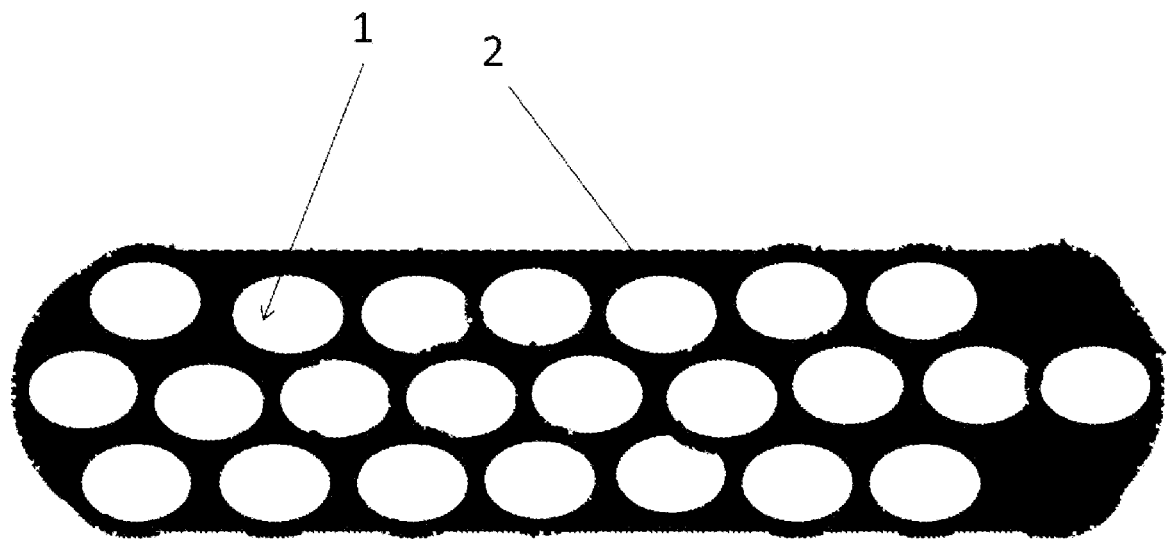
FIG. 1 is a schematic structural diagram of a lithium metal composite electrode material in an embodiment of the present application.

The drawings are not drawn to actual scale.

Reference numerals: 1—lithium metal particle; 2—lithium-containing conductive layer; 3—lithium metal battery; 4—battery module; 5—battery pack; 6—electric vehicle.

The drawings here are incorporated into the specification and constitute a part of the specification, show embodiments consistent with the present application, and are used to explain the principle of the present application together with the specification.

DETAILED DESCRIPTION

The implementation schemes of the present application will be described in detail below in conjunction with embodiments, but a person skilled in the art would understand that the following embodiments are only used to illustrate the present application and should not be regarded as limiting the scope of the present application. If specific conditions are not specified in the embodiments, the routine conditions or the conditions recommended by the manufacturer shall be followed. The reagents or instruments unmarked by any manufacturer are all conventional products that can be purchased on the market.

It should be noted that in the embodiments of the present application, if there is no special description, all the implementation manners, embodiments, and optional implementation methods mentioned herein can be combined with each other to form new technical solutions. In the embodiments of the present application, if there is no special description, all the technical features and optional features mentioned herein can be combined with each other to form new technical solutions. In the embodiments of the present application, if there is no special description, the percentage (%) or part refers to a weight percentage or weight part relative to the composition. In the embodiments of the present application, if there is no special description, the involved components or optional components can be combined with each other to form new technical solutions. In the embodiments of the present application, unless otherwise specified, the numerical range "from a to b" represents an abbreviation of any combination of real numbers between a and b, where both a and b are real numbers. For example, the numerical range "from 6 to 22" represents all real numbers "from 6 to 22" listed herein, and "from 6 to 22" is only an abbreviation of these numerical combinations. The lower limit and upper limit of the "range" disclosed in the embodiments of the present application may be one or more lower limits and one or more upper limits, respectively. In the embodiments of the present application, unless otherwise specified, each reaction or operation step may be carried out in the order described herein, and may also be carried out in a preset order. In some embodiments, the reaction methods herein are performed sequentially.

Unless otherwise specified, the professional and scientific terms used herein have the same meaning as those familiar to those skilled in the art. In addition, any method or material similar or equivalent to the recorded content may also be applied to the embodiments of the present application.

In the first aspect, an embodiment of the present application provides a lithium metal composite electrode material, which can be used in a lithium metal battery, wherein the structure of the metal composite electrode material is shown in FIG. 1, and includes:

lithium metal particles 1 and a lithium-containing conductive layer 2 serving as a supporting framework, the lithium-containing conductive layer 2 serving as a supporting framework being filled with the lithium metal particles 1; wherein the lithium-containing conductive layer 2 includes an inorganic lithium compound and a lithium alloy.

The inorganic lithium compound in an embodiment of the present application refers to a lithium-containing inorganic compound. The lithium-containing inorganic compound can form a structurally stable lithium ion conductive framework material, thereby realizing the transport of lithium ions. Meanwhile, the lithium alloy in the embodiment of the present application refers to an alloy including lithium and at least one other metal. The lithium alloy can form an electron-ion conductive structure, so as to provide more active sites for the deposition of lithium ions.

In the lithium metal composite electrode material provided by an embodiment of the present application, the lithium-containing conductive layer serves as a three-dimensional supporting framework structure to coat the lithium metal particles, thereby isolating the lithium metal particles from the electrolyte to reduce irreversible reaction between the lithium metal and the electrolyte. Meanwhile, filling the three-dimensional supporting framework structure with the lithium metal particles can also inhibit the volume expansion of lithium metal and effectively avoid the growth of lithium dendrites.

In the lithium metal composite electrode material in an embodiment of the present application, the lithium-containing conductive layer has relatively strong lithium ion transport performance, which improves the reaction speed of an electrode. In addition, the lithium-containing conductive layer has relatively strong lithium-philic characteristic. After lithium ions are dissolved, the porous supporting framework structure is retained. During the deposition of lithium ions, the lithium ions are preferentially deposited in pores of the supporting framework structure, instead of on the surface of the supporting framework. Therefore, the dissolution and deposition of lithium ions will not cause changes in the thickness direction of the electrode, thereby improving the stability of an electrode structure.

The lithium metal composite electrode material provided by an embodiment of the present application can significantly improve the cycle stability and safety of a lithium metal secondary battery.

In some embodiments, the lithium-containing conductive layer is grown in situ on surfaces of the lithium metal particles. That is, the lithium-containing conductive layer serving as a supporting framework is grown in situ on the surfaces of the lithium metal particles.

It should be noted that the "in-situ growth" refers to direct growth of the lithium-containing conductive layer including an inorganic lithium compound and a lithium alloy on the surfaces of the lithium metal particles. The in-situ grown lithium-containing conductive layer has a relatively strong binding force with the lithium metal particles. Meanwhile, the inorganic lithium compound itself has relatively strong structural stability, and therefore, can significantly improve the structural stability of the lithium metal composite electrode material and effectively inhibit the volume change of the lithium metal particles.

In some embodiments, the inorganic lithium compound includes at least one of lithium nitride, lithium sulfide, or lithium phosphide.

The lithium nitride, lithium sulfide, or lithium phosphide has relatively high ionic conductivity, and can significantly improve the reaction speed of the lithium metal composite electrode material.

The inorganic lithium compound is, for example, lithium nitride, lithium sulfide, lithium phosphide, a combination of lithium nitride and lithium sulfide, a combination of lithium nitride and lithium phosphide, a combination of lithium sulfide and lithium phosphide, or a combination of lithium nitride, lithium sulfide and lithium phosphide, etc.

In some embodiments, the metal in the lithium alloy includes, but is not limited to, at least one of Zn, Mg, Ag, Al, Ge, Sn, Sb, In, or Ga.

By selecting the above metal to form the lithium alloy, the lithium-philic characteristic of the three-dimensional supporting framework structure can be further improved. Meanwhile, after the lithium in the lithium alloy is dissolved, a porous electron-ion mixed conductive mechanism can be formed, so that lithium ions can be deposited in gaps of the supporting framework more easily, instead of on the surface of the supporting framework, thereby reducing the volume change caused in the lithium ion solvent-deposition process.

In some embodiments, the lithium-containing conductive layer has a mass percentage of from 10% to 20% in the lithium metal composite electrode material.

By limiting the percentage of the lithium-containing conductive layer in the entire lithium metal composite electrode material, the electrical performance of the lithium metal composite electrode material can be further optimized, so that the lithium metal composite electrode material has a relatively high specific capacity and a relatively high cycle stability.

The mass percentage of the lithium-containing conductive layer in the lithium metal composite electrode material may be, but is not limited to, greater than or equal to 20%, greater than or equal to 22%, or greater than or equal to 25%, and may also be less than or equal to 50%, less than or equal to 48%, or less than or equal to 45%.

In some embodiments of the present application, the lithium-containing conductive layer includes conductive carbon.

The conductive carbon added can not only improve electronic conductivity, but also help improve the mechanical strength of the lithium metal composite electrode material after sheet formation.

The conductive carbon includes, but is not limited to, at least one of carbon nanotubes, carbon fibers, or graphene.

In some embodiments, the conductive carbon has a mass percentage of from 5% to 15% in the lithium metal composite electrode material.

By optimizing the mass percentage of conductive carbon in the lithium metal composite electrode material, the conductivity of the lithium metal composite electrode material can be improved, and the lithium-containing conductive layer serving as a supporting framework structure can have a relatively strong structural stability.

It should be noted that, calculated on the basis of the mass of the lithium metal composite electrode material, the mass percentage of the conductive carbon is lower than the mass percentage of the inorganic lithium compound or lower than the sum of percentages of the inorganic lithium compound and the lithium alloy, and the mass percentage difference is controlled to be from 5% to 15%.

In some embodiments, the lithium metal particles have a particle size of from 1 μm to 50 μm, optionally from 10 μm to 50 μm, and further optionally from 15 μm to 40 μm. The particle size of the lithium metal particles is not limited to be, for example, greater than or equal to 1 μm, greater than or equal to 5 μm, or greater than or equal to 10 μm, less than or equal to 50 μm, less than or equal to 45 μm, or less than or equal to 40 μm.

By limiting the size of the lithium metal particles, the evenness of the lithium-containing conductive layer grown in situ on the surfaces of the lithium metal particles can be improved.

In the second aspect, an embodiment of the present application provides a method for preparing a lithium metal composite electrode material for a lithium metal battery, including the following step:

filling a lithium-containing conductive layer serving as a supporting framework with lithium metal particles, to obtain the lithium metal composite electrode material; wherein the lithium-containing conductive layer includes an inorganic lithium compound and a lithium alloy.

In the embodiments of the present application, the lithium-containing conductive layer serves as a supporting framework structure, and is filled with the lithium metal particles.

The lithium metal composite electrode material obtained by the preparation method of an embodiment of the present application has all the advantages of the lithium metal composite electrode material provided in the first aspect of the embodiments of the present application, and details are not desried herein again.

In some optional embodiments, the lithium-containing conductive layer serving as a supporting framework is grown in situ on surfaces of the lithium metal particles, to obtain the lithium metal composite electrode material.

In the embodiments, the formed lithium-containing conductive layer includes an inorganic lithium compound and a lithium alloy.

The "in-situ growth" refers to direct growth of the lithium-containing conductive layer including an inorganic lithium compound and a lithium alloy on the surfaces of the lithium metal particles. The in-situ grown lithium-containing conductive layer has a relatively strong binding force with the lithium metal particles. Meanwhile, the inorganic lithium compound itself has relatively strong structural stability, and therefore, can significantly improve the structural stability of the lithium metal composite electrode material and effectively inhibit the volume change of the lithium metal particles.

In some embodiments, under solvent-free and oxygen-free conditions, the lithium metal particles are in contact with a metal compound capable of reacting with lithium, to grow the lithium-containing conductive layer in situ on the surfaces of the lithium metal particles after reaction.

Lithium has relatively strong chemical activity, so in this embodiment, the method is carried out in a solvent-free and oxygen-free environment. The solvent includes water, an organic solvent, or the like. In this preparation method, the lithium metal particles are brought in contact with a metal compound capable of reacting with lithium under dry conditions, such as by dry mixing. Through the contact, the lithium metal particles and the metal in the metal compound undergo, for example, a replacement reaction, so that the lithium-containing conductive layer is grown in situ on the surfaces of the lithium metal particles.

In some embodiments, under solvent-free and oxygen-free conditions, the lithium metal particles and the metal compound are mixed and ground, and then subjected to heat treatment, to grow the lithium-containing conductive layer on the surfaces of the lithium metal particles in situ. A passivation film is usually formed on the surfaces of the lithium metal particles, and the lithium metal can fully react with the metal compound by heating.

In some embodiments, the metal compound is an inorganic metal compound. The inorganic metal compound includes, but is not limited to, at least one of metal nitride, metal sulfide, or metal phosphide, and optionally includes at least metal nitride. Lithium nitride, lithium sulfide, or lithium phosphide formed after the reaction of the metal nitride, metal sulfide, or metal phosphide with the lithium metal particles has good lithium ion conductivity, especially the lithium nitride has higher lithium ion conductivity.

In some embodiments, the metal in the metal compound is at least one selected from Zn, Ag, Al, Ge, Sn, Sb, In, or Ga, and includes at least aluminum in some embodiments.

In the preparation method of this embodiment, taking aluminum nitride as an example, because the lithium metal has relatively strong reducibility, the elemental lithium on the surfaces of the lithium metal particles is in contact with the aluminum nitride and undergoes a replacement reaction with the aluminum nitride after being heated, to reduce trivalent aluminum atoms into elemental aluminum with lithium nitride produced; and the elemental aluminum subsequently generated reacts with the lithium metal to generate a lithium-aluminum alloy. The lithium nitride and lithium-aluminum alloy generated by the reaction are distributed on the surfaces of the lithium metal particles together.

In some embodiments of the present application, the metal compound has a mass percentage of from 20% to 50%, relative to a total mass of the lithium metal particles and the metal compound. By optimizing the addition amount of the metal compound, the percentage of the generated lithium-containing conductive layer in the lithium metal composite electrode material can be effectively controlled, and the electrical performance of the lithium metal composite electrode material can be further optimized, so that the lithium metal composite electrode material has a relatively high specific capacity and a relatively high cycle stability.

The mass percentage of the metal compound in the mixed raw material may be, but is not limited to, greater than or equal to 20%, greater than or equal to 22%, or greater than or equal to 25%, and may also be less than or equal to 50%, less than or equal to 48%, or less than or equal to 45%.

In some embodiments, the metal compound may be aluminum nitride, and the addition amount of the aluminum nitride is from 25% to 35% of the lithium metal composite electrode material.

In some embodiments, the lithium metal particles and the metal compound are first mixed and ground, added with conductive carbon for mixing and grinding, and then subjected to heat treatment, to grow the lithium-containing conductive layer on the surfaces of the lithium metal particles in situ.

The conductive carbon includes, but is not limited to, at least one of carbon nanotubes, carbon fibers, or graphene. Based on the lithium metal composite electrode material, the addition amount of conductive carbon is from 2% to 15%; in some embodiments, when carbon nanotubes are used, its addition amount is from 5% to 10%; in some embodiments, when the conductive carbon is graphene, its addition amount is from 5% to 10%.

In some embodiments, the metal compound has a particle size of from 50 nm to 2 μm, the lithium metal particles have a particle size of from 1 μm to 50 μm, the particle size of the lithium metal particles is more than two times larger than that of the metal compound, and in some embodiments, the particle size of the lithium metal particles is more than five times larger than that of the metal compound. In the preparation method of the embodiment of the present application, the particle size of the lithium metal particles obtained by mixing and grinding is much larger than that of the metal compound, so the reaction only occurs on the surface of the lithium metal.

In some embodiments, the heat treatment is carried out at a temperature of from 100° C. to 300° C. for 1 h to 2 h. In some embodiments, when the metal compound includes at least aluminum nitride, the heat treatment is carried out at a temperature of from 150° C. to 200° C.

By optimizing the heat treatment process, the reaction can be fully carried out, and the metal compound can be fully reacted to generate the lithium-containing conductive layer.

The lithium metal composite electrode material prepared by the preparation method of an embodiment of the present application has a unique three-dimensional framework structure. During the mixing, grinding and heating of the raw materials, the lithium metal reacts in situ with the framework material such as nitride, sulfide, or phosphide to generate a lithium alloy and lithium ion conductive material serving as a three-dimensional supporting framework structure. Unreacted lithium metal particles fill the inside of the framework, and the inorganic lithium compound and the lithium alloy in the framework structure have relatively strong lithium-philic characteristic, especially the lithium alloy has stronger lithium-philic characteristic. During a charge and discharge cycle of the battery, the lithium metal is dissolved to retain a porous electron-ion mixed conductive framework, the lithium metal can be preferentially deposited in the pores of the framework, and the lithium nitride, lithium sulfide or lithium phosphide generated also has relatively high ionic conductivity, which can significantly increase the reaction speed of an electrode. On the other hand, the added conductive carbon such as carbon nanotubes or graphene can improve electronic conductivity, facilitates the sheet formation of the electrode, and can improve the mechanical strength of the formed electrode. The lithium metal composite electrode prepared by the method inhibits the volume effect of lithium metal and the generation of lithium dendrites, reduces the consumption of an electrolyte, and significantly improves the cycle stability of the electrode.

In some embodiments, the mixed and ground raw materials may be first pressed into a sheet and then subjected to heat treatment. The pressing is conducive to the replacement reaction of lithium with other metal. The pressure used in the pressing may be, for example, from 1 MPa to 6 MPa, and in some embodiments, the pressure used may be from 3 MPa to 4 MPa.

In the third aspect, an embodiment of the present application provides a lithium metal composite electrode for a lithium metal battery, including the lithium metal composite electrode material according to the first aspect of the embodiments of the present application or the lithium metal composite electrode material obtained by the preparation method according to the second aspect of the embodiments of the present application.

The lithium metal composite electrode material of the embodiments of the present application or the lithium metal composite electrode material obtained by the preparation method of the embodiments of the present application is pressed into a sheet to obtain the lithium metal composite electrode. If the lithium metal composite electrode material itself is pressed into a sheet during the preparation, it can be directly used as the lithium metal composite electrode.

Figure 9:
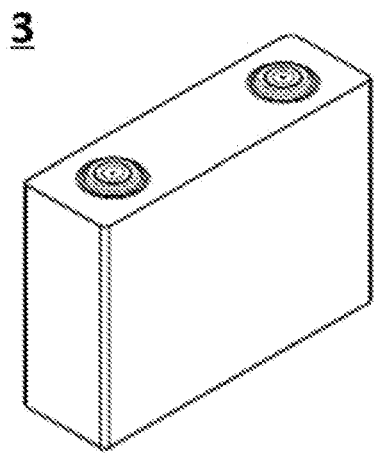
FIG. 9 is a schematic structural diagram of a lithium metal battery in an embodiment of the present application.

In the fourth aspect, an embodiment of the present application provides a lithium metal battery, as shown in FIG. 9, including the lithium metal composite electrode according to the embodiments of the present application.

Referring to FIG. 9, the lithium metal battery 3 may include, for example, a case, an electrode assembly, a top cover assembly, an electrolyte, etc.

The cycle stability of the lithium metal composite electrode prepared by the method in the lithium-lithium symmetric battery is greatly improved. Compared with ordinary lithium metal electrodes, the cycle stability and operational safety of the lithium metal secondary battery using the lithium metal composite electrode as a negative electrode are greatly improved.

Figure 10:
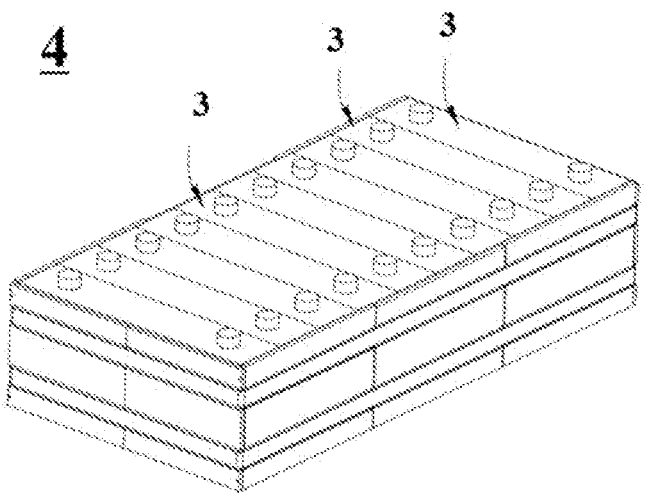
FIG. 10 is a schematic structural diagram of a battery module in an embodiment of the present application.

In the fifth aspect, an embodiment of the present application provides a battery module, as shown in FIG. 10, including the lithium metal battery according to the fourth aspect of the embodiments of the present application.

Referring to FIG. 10, the battery module 4 includes a plurality of lithium metal batteries 3. The lithium metal batteries 3 are arranged in a longitudinal direction. The battery module 4 may be used as a power source or an energy storage apparatus. The number of lithium metal batteries 3 in the battery module 4 may be adjusted according to the application and capacity of the battery module 4.

In the sixth aspect, an embodiment of the present application provides a battery pack, including the battery module according to the fifth aspect of the embodiments of the present application.

Figure 11:
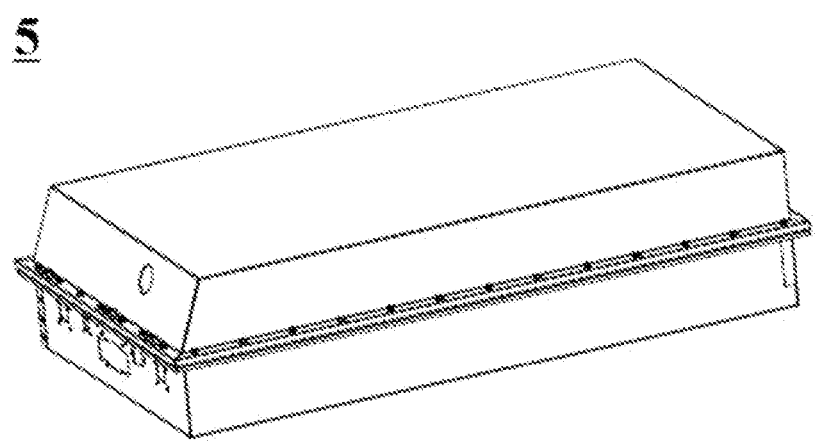
FIG. 11 is a schematic structural diagram of a battery pack in an embodiment of the present application.

Referring to FIG. 11, the battery pack 5 includes an upper box, a lower box, and battery modules 4. The upper box and the lower box are assembled together to form a space for accommodating the battery modules 4. The battery modules 4 are placed in the space of the assembled upper box and lower box. Output electrodes of the battery modules 4 pass through one or both of the upper box and the lower box to supply power to the outside or receive power from the outside. The number and arrangement of the battery modules 4 used in the battery pack 5 may be determined according to actual requirements. The battery pack 5 may be used as a power source or an energy storage apparatus.

Figure 12:
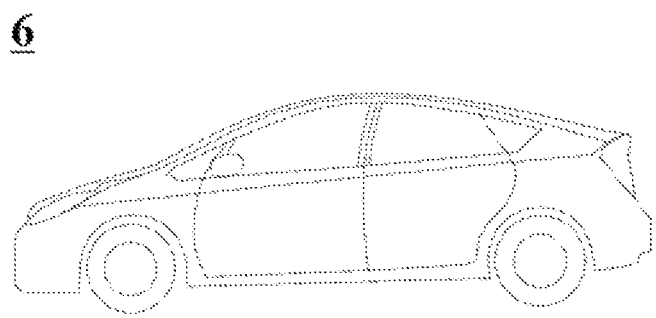
FIG. 12 is a schematic structural diagram of an apparatus using a lithium metal battery as a power source in an embodiment of the present application.

In the seventh aspect, an embodiment of the present application provides an apparatus. As shown in FIG. 12, the apparatus uses a lithium metal battery as a power source, and includes the battery pack according to the sixth aspect of the embodiments of the present application.

Referring to FIG. 12, the apparatus is an electric car 6. Of course, the apparatus is not limited to this. The apparatus may be any electric vehicle (such as an electric bus, an electric tram, an electric bicycle, an electric motorcycle, an electric scooter, an electric golf cart, an electric truck) in addition to the electric car, an electric ship, an electric tool, electronic equipment, and an energy storage system. The electric vehicle may be a pure electric vehicle, a hybrid electric vehicle, or a plug-in hybrid electric vehicle. Of course, according to the actual use form, the apparatus provided in the seventh aspect of the embodiments of the present application may include the battery module 4 according to the fifth aspect of the embodiments of the present application. Of course, the apparatus provided in the seventh aspect of the embodiments of the present application may also include the battery pack 5 according to the sixth aspect of the embodiments of the present application.

The battery module, the battery pack and the apparatus of the embodiments of the present application include the lithium metal battery of the embodiments of the present application, and thus have at least the same advantages as the lithium metal battery Hereinafter, the lithium metal composite electrode material of the present application will be described in further detail in conjunction with examples and comparative examples.

Exemplary Embodiments

Embodiment 1. A lithium metal composite electrode material for a lithium metal battery, comprising:

lithium metal particles and a lithium-containing conductive layer serving as a supporting framework, the supporting framework being filled with the lithium metal particles, wherein the lithium-containing conductive layer comprises an inorganic lithium compound and a lithium alloy.

Embodiment 2. The lithium metal composite electrode material according to embodiment 1, wherein the lithium-containing conductive layer is grown in situ on surfaces of the lithium metal particles.

Embodiment 3. The lithium metal composite electrode material according to any one of embodiments 1 and 2, wherein the inorganic lithium compound comprises at least one of lithium nitride, lithium sulfide, or lithium phosphide;

the metal in the lithium alloy is at least one selected from Zn, Mg, Ag, Al, Ge, Sn, Sb, In, or Ga.

Embodiment 4. The lithium metal composite electrode material according to any one of embodiments 1 to 3, wherein the lithium-containing conductive layer has a mass percentage of from 10% to 20% in the lithium metal composite electrode material.

Embodiment 5. The lithium metal composite electrode material according to any one of embodiments 1 to 4, wherein the lithium-containing conductive layer includes conductive carbon;

preferably, the conductive carbon comprises at least one of carbon nanotubes, carbon fibers, or graphene;

preferably, the conductive carbon has a mass percentage of from 5% to 15% in the lithium metal composite electrode material.

Embodiment 6. A method for preparing a lithium metal composite electrode material for a lithium metal battery, comprising the following step of:

filling a lithium-containing conductive layer serving as a supporting framework with lithium metal particles, to obtain the lithium metal composite electrode material, wherein the lithium-containing conductive layer comprises an inorganic lithium compound and a lithium alloy.

Embodiment 7. The preparation method according to embodiment 6, comprising the following step:

growing the lithium-containing conductive layer serving as a supporting framework in situ on surfaces of the lithium metal particles, to obtain the lithium metal composite electrode material;

preferably, under solvent-free and oxygen-free conditions, the lithium metal particles being in contact with a metal compound capable of reacting with lithium, to grow the lithium-containing conductive layer in situ on the surfaces of the lithium metal particles after reaction;

preferably, under solvent-free and oxygen-free conditions, mixing and grinding the lithium metal particles and the metal compound, and then performing heat treatment, to grow the lithium-containing conductive layer on the surfaces of the lithium metal particles in situ;

preferably the metal compound having a mass percentage of from 20% to 50%, relative to a total mass of the lithium metal particles and the metal compound.

Embodiment 8. The preparation method according to embodiment 7, wherein the lithium metal particles and the metal compound are first mixed and ground, added with conductive carbon for mixing and grinding, and then subjected to heat treatment, to grow the lithium-containing conductive layer on the surfaces of the lithium metal particles in situ;

preferably, the conductive carbon has a mass percentage of from 5% to 15% in the lithium metal composite electrode material;

preferably, after mixing and grinding, pressing into a sheet is carried out first, and then the heat treatment is carried out.

Embodiment 9. The preparation method according to embodiment 7 or 8, wherein the metal compound is an inorganic metal compound;

preferably, the inorganic metal compound comprises at least one of metal nitride, metal sulfide, or metal phosphide, and preferably comprises at least metal nitride;

preferably, the metal in the metal compound is at least one selected from Zn, Ag, Al, Ge, Sn, Sb, In, or Ga, and preferably comprises at least aluminum;

preferably, the metal compound has a particle size of from 50 nm to 2 μm, and the lithium metal particles have a particle size of from 1 μm to 50 μm; the particle size of the lithium metal particles is at least two times larger than that of the metal compound, and preferably, the particle size of the lithium metal particles is five times larger than that of the metal compound.

Embodiment 10. The preparation method according to embodiment 9, wherein the heat treatment is carried out at a temperature of from 100° C. to 300° C. for from 1 h to 2 h;

preferably, when the metal compound comprises at least aluminum nitride, the heat treatment is carried out at a temperature of from 150° C. to 200° C.

Embodiment 11. A lithium metal composite electrode for a lithium metal battery, comprising the lithium metal composite electrode material according to any one of embodiments 1-5 or the lithium metal composite electrode material obtained by the method according to any one of embodiments 6-10.

Embodiment 12. A lithium metal battery, comprising the lithium metal composite electrode according to embodiment 11.

Embodiment 13. A battery module, comprising the lithium metal battery according to embodiment 12.

Embodiment 14. A battery pack, comprising the battery module according to embodiment 13.

Embodiment 15. An apparatus using a lithium metal battery as a power source, comprising the battery pack according to embodiment 14.

Embodiment 16. The apparatus according to embodiment 15, wherein the apparatus comprises an electric vehicle, a hybrid electric vehicle, a plug-in hybrid electric vehicle, an electric bicycle, an electric scooter, an electric golf cart, an electric truck, an electric ship, or an energy storage system.

Example 1

In this example, a lithium metal composite electrode material was prepared from aluminum nitride, lithium metal powder and carbon nanotubes as raw materials, and a method for preparing the same included the following steps:

Step S110: in a water-free and oxygen-free environment, aluminum nitride with a particle size of from 1 μm to 2 μm and lithium metal powder with a particle size of from 10 μm to 50 μm were mixed and ground uniformly, wherein the raw materials were mixed based on a mass ratio of aluminum nitride: lithium metal powder of 1:2;

Step S120: in the water-free and oxygen-free environment, 10% of carbon nanotubes was added to the mixture obtained in step S110, followed by uniform mixing, wherein the addition amount of carbon nanotubes was calculated based on the weight of all the raw materials added; then a certain amount of mixture was weighed, spread in a press mold, and pressed into a sheet electrode with a diameter of 11 mm under a pressure of 3 MPa;

Step S130: in the water-free and oxygen-free environment, heat treatment was performed on the pressed sheet electrode at 150° C. for 2 hours to obtain a lithium metal composite electrode.

The manufactured lithium metal composite electrodes were used to assemble a lithium-lithium symmetric battery and a full battery. The full battery was a lithium metal battery assembled using the lithium metal composite electrode in this example as a negative electrode and lithium iron phosphate as a positive electrode. The electrolyte was a mixed solution of ethylene carbonate (EC), dimethyl carbonate (DMC), and fluoroethylene carbonate (FEC), including 1M (mol/L) lithium hexafluorophosphate (LiPF$_6$), wherein the volume ratio of EC, DMC and FEC was 45:45:10.

Comparative Example 1

The difference between the full batteries in this comparative example and Example 1 lied in that the negative electrode used in this comparative example was a lithium metal sheet, the positive electrode was also a lithium iron phosphate positive electrode, and the specific composition was the same as that in Example 1.

Figure 2A:
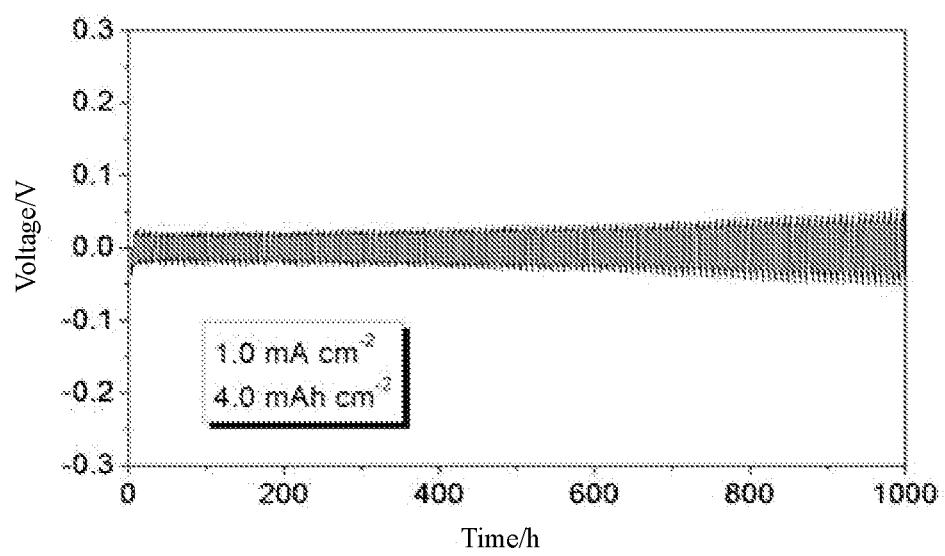
FIG. 2*a* is a cycle curve diagram of a lithium-lithium symmetric battery in Example 1 of the present application under the conditions of 1 $mA/cm^2$ current density and 4 $mAh/cm^2$ areal capacity.
Figure 2B:
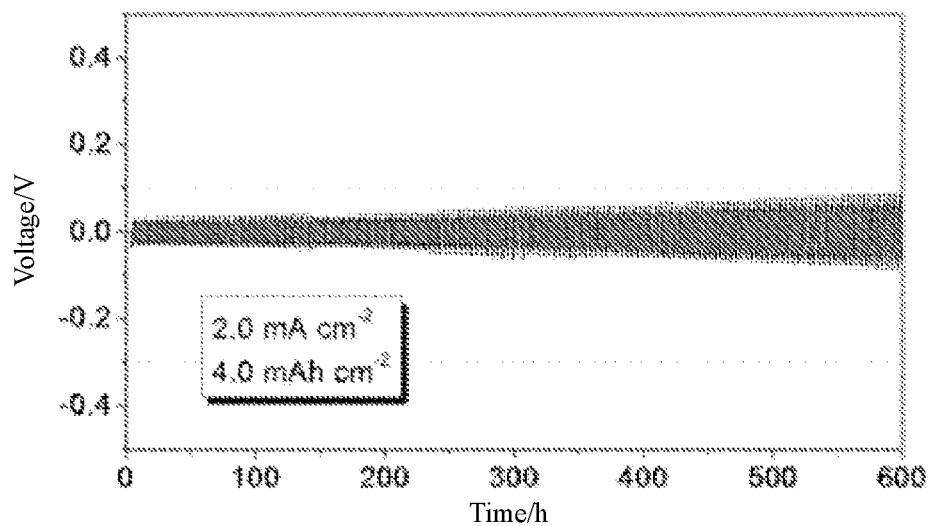
FIG. 2*b* is a cycle curve diagram of the lithium-lithium symmetric battery in Example 1 of the present application under the conditions of 2 $mA/cm^2$ current density and 4 $mAh/cm^2$ areal capacity.

The cycle performance of the lithium-lithium symmetric battery manufactured in Example 1 under the conditions of 1 mA/cm$^2$ current density and 4 mAh/cm$^2$ areal capacity was shown in FIG. 2a, and after 1000 hours, the polarization voltage stabilized at about 40 mV. The cycle performance of the lithium-lithium symmetric battery under the conditions of 2 mA/cm$^2$ current density and 4 mAh/cm$^2$ areal capacity was shown in FIG. 2b, and after 600 hours, the polarization voltage stabilized at about 70 mV.

Figure 3:
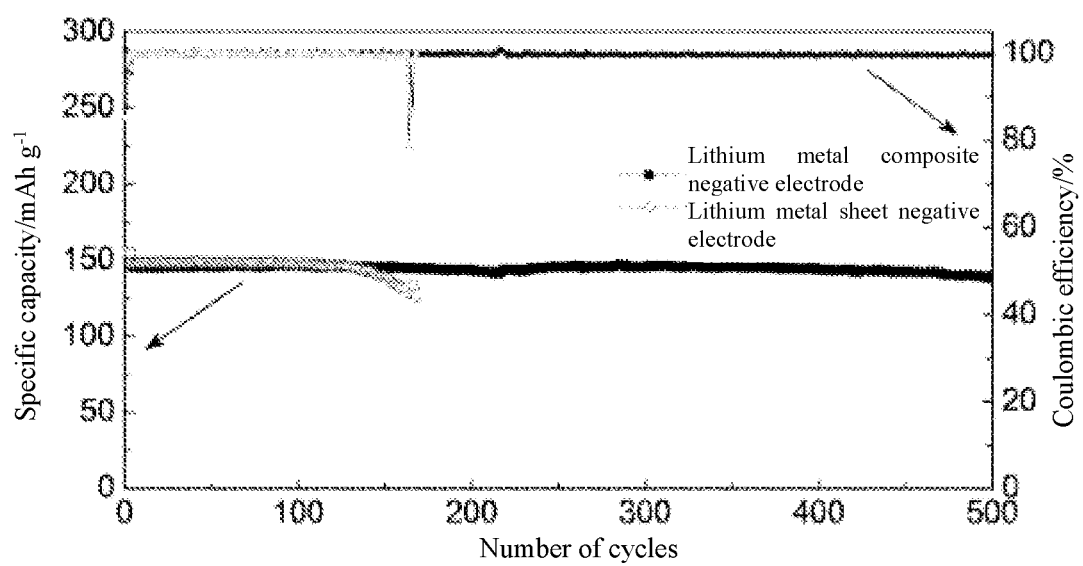
FIG. 3 is a diagram of constant-current charge and discharge cycle curves of lithium metal full batteries in Example 1 and Comparative Example 1 of the present application.

In Example 1, the full battery with the lithium metal composite electrode as a negative electrode and lithium iron phosphate with a loading capacity of 8 mg/cm$^2$ as a positive electrode had a constant-current charge and discharge cycle curve as shown in FIG. 3a at a rate of 2C, and a capacity retention rate of 95% after 500 cycles, and was not short-circuited. In Comparative Example 1, the full battery with an ordinary lithium metal sheet as a negative electrode and lithium iron phosphate with a loading capacity of 8 mg/cm$^2$ as a positive electrode had a constant-current charge and discharge cycle curve as shown in FIG. 3b under the same condition, and was short-circuited after 175 cycles.

Example 2

A lithium metal composite electrode was prepared from nano aluminum nitride, lithium metal powder and graphene as raw materials by the following steps:

Step S110: in a water-free and oxygen-free environment, aluminum nitride with a particle size of from 1 μm to 2 μm and lithium metal powder with a particle size of from 10 μm to 50 μm were mixed and ground uniformly, wherein in the raw materials, the mass ratio of the aluminum nitride to the lithium metal powder was 1:2;

Step S120: in the water-free and oxygen-free environment, 5% of graphene was added to the mixture obtained in step S110, followed by uniform mixing, wherein the addition amount was calculated based on the weight of all the raw materials added; then a certain amount of mixture was weighed, spread in a press mold, and pressed into a sheet electrode under a pressure of 3 MPa;

Step S130: in the water-free and oxygen-free environment, heat treatment was performed on the pressed sheet electrode at 150° C. for 2 hours to obtain the lithium metal composite electrode.

The manufactured lithium metal composite electrodes were used to assemble a lithium-lithium symmetric battery and a full battery. The full battery was a lithium metal battery assembled using the lithium metal composite electrode in this example as a negative electrode and lithium iron phosphate as a positive electrode. The positive electrode was the same as that in Example 1, and the loading capacity of the lithium iron phosphate in the positive electrode was 8 mg/cm$^2$. The electrolyte was a mixed solution of ethylene carbonate, dimethyl carbonate, and fluoroethylene carbonate, including 1M (mol/L) lithium hexafluorophosphate (LiPF$_6$), wherein the volume ratio of the ethylene carbonate, the dimethyl carbonate and the fluoroethylene carbonate was 45:45:10.

Figure 4A:
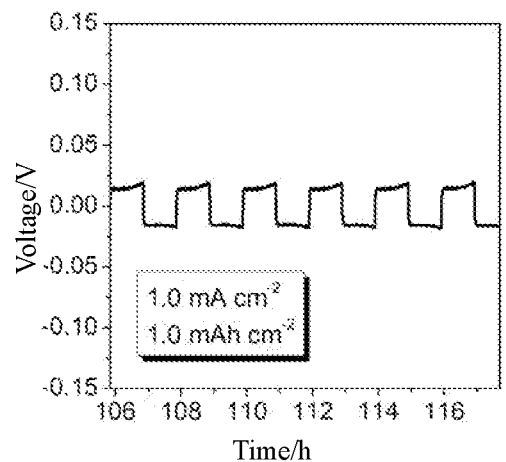
FIG. 4*a* shows a cycle curve of a lithium-lithium symmetric battery in Example 2 of the present application under the conditions of 1 $mA/cm^2$ current density and 1 $mAh/cm^2$ areal capacity.
Figure 4B:
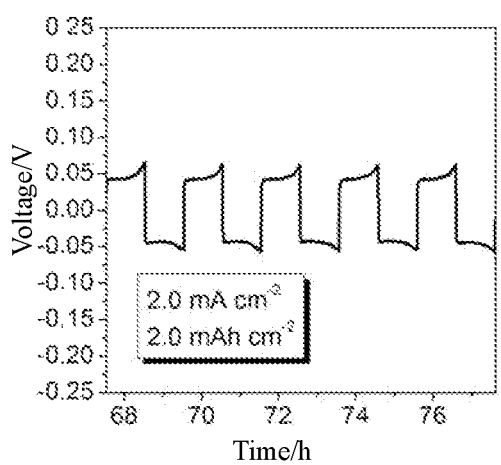
FIG. 4*b* shows a cycle curve of the lithium-lithium symmetric battery in Example 2 of the present application under the conditions of 2 $mA/cm^2$ current density and 2 $mAh/cm^2$ areal capacity.

The cycle curves of the lithium-lithium symmetric battery manufactured in this example were shown in FIG. 4a and FIG. 4b. Under the conditions of 1 mA/cm$^2$ current density and 1 mAh/cm$^2$ areal capacity, the polarization voltage was about 15 mV; under the conditions of 2 mA/cm$^2$ current density and 1 mAh/cm$^2$ areal capacity, the polarization voltage was about 40 mV. It can be seen from FIG. 4 that the battery had better cycle reversibility.

Example 3

A lithium metal composite electrode was prepared from aluminum sulfide, lithium metal powder and carbon nanotubes as raw materials by the following steps:

Step S110: in a water-free and oxygen-free environment, aluminum sulfide with a particle size of from 1 μm to 2 μm and lithium metal powder with a particle size of from 10 μm to 50 μm were mixed and ground uniformly, wherein in the raw materials, the mass ratio of the aluminum sulfide to the lithium metal powder was 1:3;

Step S120: in the water-free and oxygen-free environment, 10% of carbon nanotubes was added to the mixture obtained in step S110, followed by uniform mixing, wherein the addition amount of carbon nanotubes was calculated based on the weight of all the raw materials added; then a certain amount of mixture was weighed, spread in a press mold, and pressed into a sheet electrode under a pressure of 4 MPa;

Step S130: in the water-free and oxygen-free environment, heat treatment was performed on the pressed sheet electrode at 120° C. for 2 hours to obtain a lithium metal composite negative electrode.

The manufactured lithium metal composite electrodes were used to assemble a lithium-lithium symmetric battery and a full battery. The full battery was a lithium metal battery assembled using the lithium metal composite electrode in this example as a negative electrode and lithium iron phosphate as a positive electrode. The positive electrode was the same as that in Example 1, and the loading capacity of the lithium iron phosphate in the positive electrode was 8 mg/cm². The electrolyte was a mixed solution of ethylene carbonate (EC), dimethyl carbonate (DMC), and fluoroethylene carbonate (FEC), including 1M (mol/L) lithium hexafluorophosphate (LiPF$_6$), wherein the volume ratio of EC, DMC and FEC was 45:45:10.

Figure 5:
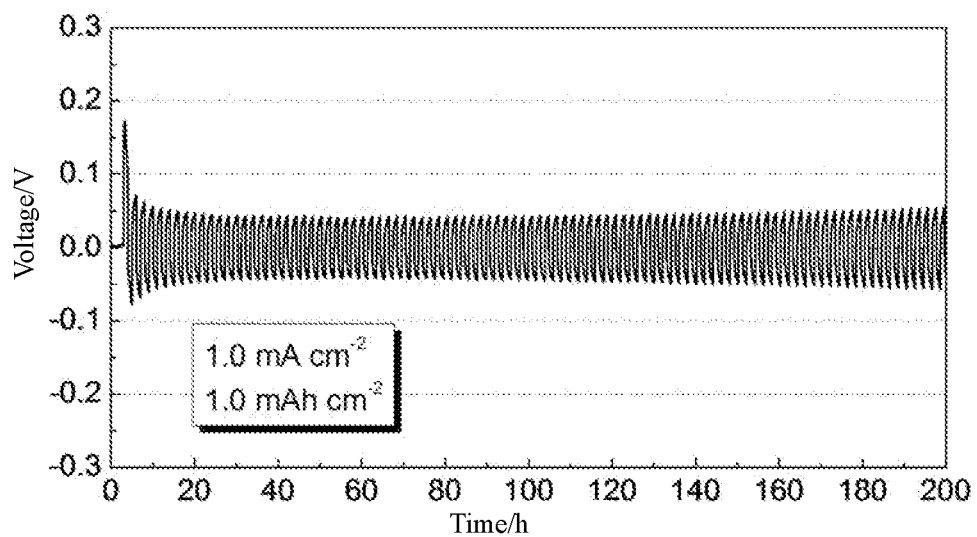
FIG. 5 shows a cycle curve of a lithium-lithium symmetric battery in Example 3 of the present application under the conditions of 1 $mA/cm^2$ current density and 1 $mAh/cm^2$ areal capacity.

The cycle performance of the lithium-lithium symmetric battery manufactured in this example under the conditions of 1 mA/cm² current density and 1 mAh/cm² areal capacity was shown in FIG. 5, and after 200 hours, the polarization voltage stabilized at about 50 mV.

Example 4

A lithium metal composite electrode was prepared from gallium phosphide, lithium metal powder and carbon nanotubes as raw materials by the following steps:

Step S110: in a water-free and oxygen-free environment, gallium phosphide with a particle size of from 1 μm to 2 μm and lithium metal powder with a particle size of from 10 μm to 50 μm were mixed and ground uniformly, wherein in the raw materials, the mass ratio of the gallium phosphide to the lithium metal powder was 1:2;

Step S120: in the water-free and oxygen-free environment, 10% of carbon nanotubes was added to the mixture obtained in step S110, followed by uniform mixing, wherein the addition amount of carbon nanotubes was calculated based on the weight of all the raw materials added; then a certain amount of mixture was weighed, spread in a press mold, and pressed into a sheet electrode under a pressure of 3 MPa;

Step S130: in the water-free and oxygen-free environment, heat treatment was performed on the pressed sheet electrode at 150° C. for 2 hours to obtain the lithium metal composite electrode.

The manufactured lithium metal composite electrode was assembled into a lithium-lithium symmetric battery and a full battery respectively. The full battery was a lithium metal battery assembled using the lithium metal composite electrode in this example as a negative electrode and lithium iron phosphate as a positive electrode. The positive electrode was the same as that in Example 1, and the loading capacity of the lithium iron phosphate in the positive electrode was 8 mg/cm². The electrolyte was a mixed solution of ethylene carbonate (EC), dimethyl carbonate (DMC), and fluoroethylene carbonate (FEC), including 1M (mol/L) lithium hexafluorophosphate (LiPF$_6$), wherein the volume ratio of EC, DMC and FEC was 45:45:10.

Figure 6:
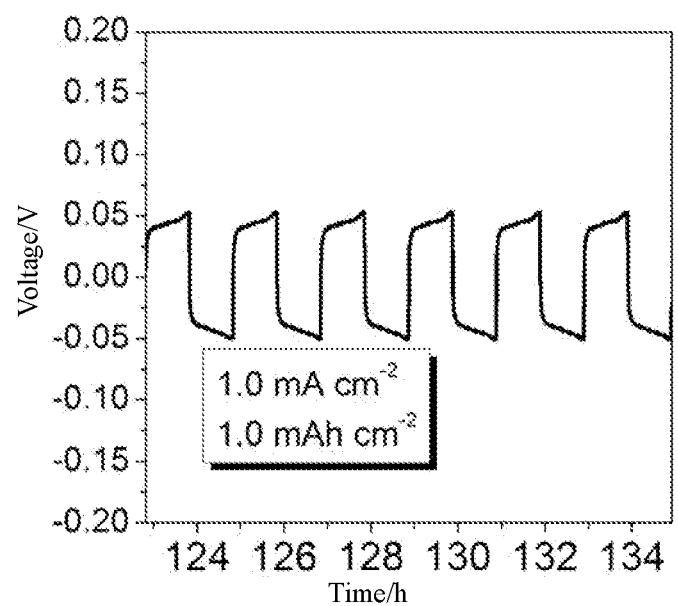
FIG. 6 shows a capacity-voltage curve of a lithium-lithium symmetric battery in Example 4 of the present application under the conditions of 1 $mA/cm^2$ current density and 1 $mAh/cm^2$ areal capacity.

The polarization voltage of the lithium-lithium symmetric battery manufactured in this example was shown in FIG. 6. Under the conditions of 1 mA/cm² current density and 1 mAh/cm² areal capacity, the polarization voltage was about 42 mV, and the cycle reversibility was good.

Example 5

A lithium metal composite electrode was prepared from aluminum nitride, aluminum sulfide, lithium metal powder and carbon nanotubes as raw materials by the following steps:

Step S110: in a water-free and oxygen-free environment, aluminum nitride with a particle size of from 1 μm to 2 μm, aluminum sulfide with a particle size of from 1 μm to 2 μm, and lithium metal powder with a particle size of from 10 μm to 50 μm were mixed and ground uniformly, wherein in the raw materials, the mass ratio of the aluminum nitride, the aluminum sulfide, and the lithium powder was 0.5:0.5:3;

Step S120: in the water-free and oxygen-free environment, 10% of carbon nanotubes was added to the mixture obtained in step S110, followed by uniform mixing, and then a certain amount of mixture was weighed, spread in a press mold, and pressed into a sheet electrode under a pressure of 3 MPa;

Step S130: in the water-free and oxygen-free environment, heat treatment was performed on the pressed sheet electrode at 120° C. for 2 hours to obtain the lithium metal composite electrode.

The manufactured lithium metal composite electrodes were used to assemble a lithium-lithium symmetric battery and a full battery. The full battery was a lithium metal battery assembled using the lithium metal composite electrode in this example as a negative electrode and lithium iron phosphate as a positive electrode. The positive electrode was the same as that in Example 1, and the loading capacity of the lithium iron phosphate in the positive electrode was 8 mg/cm². The electrolyte was a mixed solution of ethylene carbonate (EC), dimethyl carbonate (DMC), and fluoroethylene carbonate (FEC), including 1M (mol/L) lithium hexafluorophosphate (LiPF$_6$), wherein the volume ratio of EC, DMC and FEC was 45:45:10.

Figure 7A:
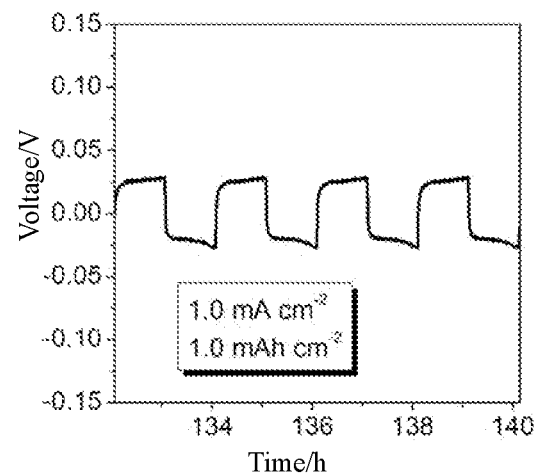
FIG. 7*a* shows a cycle curve of a lithium-lithium symmetric battery in Example 5 of the present application under the conditions of 1 $mA/cm^2$ current density and 1 $mAh/cm^2$ areal capacity.
Figure 7B:
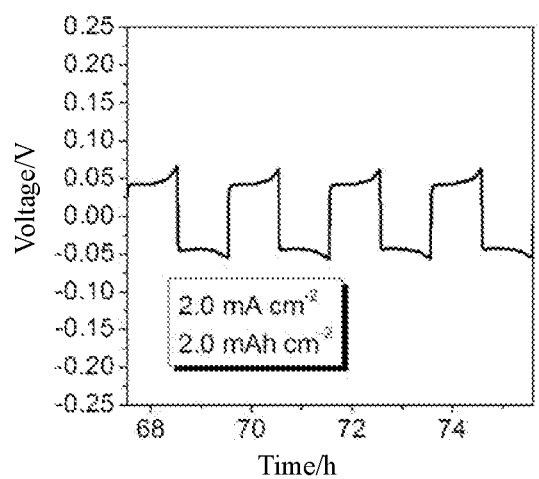
FIG. 7*b* shows a cycle curve of the lithium-lithium symmetric battery in Example 5 of the present application under the conditions of 2 $mA/cm^2$ current density and 2 $mAh/cm^2$ areal capacity.

The polarization voltage of the lithium-lithium symmetric battery manufactured in this example was shown in FIG. 7. Under the conditions of 1 mA/cm² current density and 1 mAh/cm² areal capacity, the polarization voltage was about 25 mV; under the conditions of 2 mA/cm² current density and 1 mAh/cm² areal capacity, the polarization voltage was about 50 mV, and the cycle reversibility was good.

Example 6

A lithium metal composite electrode was prepared from nano aluminum nitride, lithium metal powder and carbon nanotubes as raw materials by the following steps:

Step S110: in a water-free and oxygen-free environment, aluminum nitride with a particle size of from 1 μm to 2 μm and lithium metal powder with a particle size of from 10 μm to 50 μm were mixed and ground uniformly, wherein in the raw materials, the mass ratio of the aluminum nitride to the lithium metal powder was 1:2;

Step S120: in the water-free and oxygen-free environment, 10% of carbon nanotubes was added to the mixture obtained in step S110, followed by uniform mixing, wherein the addition amount of carbon nanotubes was calculated based on the weight of all the raw materials added;

Step S130: in the water-free and oxygen-free environment, a certain amount of mixture was weighed, and heat treatment was performed on the pressed sheet electrode at 150° C. for 2 hours to obtain a lithium metal composite electrode material;

Step S140: the lithium metal composite electrode material was pressed into a sheet electrode with a diameter of 11 mm under a pressure of 3 MPa to obtain the lithium metal composite electrode.

The manufactured lithium metal composite electrode was used to assemble a lithium metal full battery. The lithium metal full battery was assembled using the lithium metal composite electrode in this example as a negative electrode and lithium iron phosphate as a positive electrode. The positive electrode was the same as that in Example 1, and the loading capacity of the lithium iron phosphate in the positive electrode was 8 mg/cm$^2$. The electrolyte was a mixed solution of ethylene carbonate (EC), dimethyl carbonate (DMC), and fluoroethylene carbonate (FEC), including 1M (mol/L) lithium hexafluorophosphate (LiPF$_6$), wherein the volume ratio of EC, DMC and FEC was 45:45:10.

Example 7

A lithium metal composite electrode was prepared from nano aluminum nitride, lithium metal powder and graphene as raw materials by the following steps:

Step S110: in a water-free and oxygen-free environment, aluminum nitride with a particle size of from 1 μm to 2 μm and lithium metal powder with a particle size of from 10 μm to 50 μm were mixed and ground uniformly, wherein in the raw materials, the mass ratio of the aluminum nitride to the lithium metal powder was 1:1.5;

Step S120: in the water-free and oxygen-free environment, 5% of graphene was added to the mixture obtained in step S110, followed by uniform mixing, wherein the addition amount of graphene was calculated based on the weight of all the raw materials added; then a certain amount of mixture was weighed, spread in a press mold, and pressed into a sheet electrode under a pressure of 4 MPa;

Step S130: in the water-free and oxygen-free environment, heat treatment was performed on the pressed sheet electrode at 150° C. for 2 hours to obtain a lithium metal composite electrode.

The manufactured lithium metal composite electrode was used to assemble a lithium metal full battery. The lithium metal full battery was assembled using the lithium metal composite electrode in this example as a negative electrode and lithium iron phosphate as a positive electrode. The positive electrode was the same as that in Example 1, and the loading capacity of the lithium iron phosphate in the positive electrode was 8 mg/cm$^2$. The electrolyte was a mixed solution of ethylene carbonate (EC), dimethyl carbonate (DMC), and fluoroethylene carbonate (FEC), including 1M (mol/L) lithium hexafluorophosphate (LiPF$_6$), wherein the volume ratio of EC, DMC and FEC was 45:45:10.

Example 8

A lithium metal composite electrode was prepared from nano aluminum nitride, lithium metal powder and graphene as raw materials by the following steps:

Step S110: in a water-free and oxygen-free environment, aluminum nitride with a particle size of from 1 μm to 2 μm and lithium metal powder with a particle size of from 10 μm to 50 μm were mixed and ground uniformly, wherein in the raw materials, the mass ratio of the aluminum nitride to the lithium metal powder was 1:1;1;

Step S120: in the water-free and oxygen-free environment, 5% of graphene was added to the mixture obtained in step S110, followed by uniform mixing, wherein the addition amount of graphene was calculated based on the weight of all the raw materials added; then a certain amount of mixture was weighed, spread in a press mold, and pressed into a sheet electrode under a pressure of 4 MPa;

Step S130: in the water-free and oxygen-free environment, heat treatment was performed on the pressed sheet electrode at 150° C. for 2 hours to obtain the lithium metal composite electrode.

The manufactured lithium metal composite electrode was used to assemble a lithium metal full battery. The lithium metal full battery was assembled using the lithium metal composite electrode in this example as a negative electrode and lithium iron phosphate as a positive electrode. The positive electrode was the same as that in Example 1, and the loading capacity of the lithium iron phosphate in the positive electrode was 8 mg/cm$^2$. The electrolyte was a mixed solution of ethylene carbonate (EC), dimethyl carbonate (DMC), and fluoroethylene carbonate (FEC), including 1M (mol/L) lithium hexafluorophosphate (LiPF$_6$), wherein the volume ratio of EC, DMC and FEC was 45:45:10.

Example 9

A lithium metal composite electrode was prepared from nano aluminum nitride, lithium metal powder and graphene as raw materials by the following steps:

Step S110: in a water-free and oxygen-free environment, aluminum nitride with a particle size of from 1 μm to 2 μm and lithium metal powder with a particle size of from 5 μm to 20 μm were mixed and ground uniformly, wherein in the raw materials, the mass ratio of the aluminum nitride to the lithium metal powder was 1:2;

Step S120: in the water-free and oxygen-free environment, 5% of graphene was added to the mixture obtained in step S110, followed by uniform mixing, wherein the addition amount of graphene was calculated based on the weight of all the raw materials added; then a certain amount of mixture was weighed, spread in a press mold, and pressed into a sheet electrode under a pressure of 3 MPa;

Step S130: in the water-free and oxygen-free environment, heat treatment was performed on the pressed sheet electrode at 150° C. for 2 hours to obtain a lithium metal composite electrode.

The manufactured lithium metal composite electrode was assembled into a lithium-lithium full battery. The lithium-lithium full battery was assembled using the lithium metal composite electrode in this example as a negative electrode and lithium iron phosphate as a positive electrode. The electrolyte was a mixed solution of ethylene carbonate (EC), dimethyl carbonate (DMC), and fluoroethylene carbonate (FEC), including 1M (mol/L) lithium hexafluorophosphate (LiPF$_6$), wherein the volume ratio of EC, DMC and FEC was 45:45:10.

Example 10

A lithium metal composite electrode was prepared from nano silver nitride, magnesium sulfide, lithium metal powder and graphene as raw materials by the following steps:

Step S110: in a water-free and oxygen-free environment, silver nitride with a particle size of from 1 μm to 2 μm and lithium metal powder with a particle size of from 10 μm to 50 μm were mixed and ground uniformly, wherein in the raw materials, the mass ratio of the silver nitride, the magnesium sulfide and the lithium powder was 0.5:0.5:3;

Step S120: in the water-free and oxygen-free environment, 5% of graphene was added to the mixture obtained in step S110, followed by uniform mixing, wherein the addition amount of graphene was calculated based on the weight of all the raw materials added; then a certain amount of mixture was weighed, spread in a press mold, and pressed into a sheet electrode under a pressure of 3 MPa;

Step S130: in the water-free and oxygen-free environment, heat treatment was performed on the pressed sheet electrode at 150° C. for 2 hours to obtain the lithium metal composite electrode.

The manufactured lithium metal composite electrode was assembled into a lithium metal full battery. The lithium metal full battery was assembled using the lithium metal composite electrode in this example as a negative electrode and lithium iron phosphate as a positive electrode. The positive electrode was the same as that in Example 1, and the loading capacity of the lithium iron phosphate in the positive electrode was 8 mg/cm$^2$. The electrolyte was a mixed solution of ethylene carbonate (EC), dimethyl carbonate (DMC), and fluoroethylene carbonate (FEC), including 1M (mol/L) lithium hexafluorophosphate (LiPF$_6$), wherein the volume ratio of EC, DMC and FEC was 45:45:10.

Example 11

A lithium metal composite electrode was prepared from nano tin sulfide, zinc phosphide, lithium metal powder and graphene as raw materials by the following steps:

Step S110: in a water-free and oxygen-free environment, tin sulfide with a particle size of from 1 μm to 2 μm and lithium metal powder with a particle size of from 10 μm to 50 μm were mixed and ground uniformly, wherein in the raw materials, the mass ratio of the tin sulfide, the zinc phosphide and the lithium powder was 0.5:0.5:3;

Step S120: in the water-free and oxygen-free environment, 5% of graphene was added to the mixture obtained in step S110, followed by uniform mixing, wherein the addition amount of graphene was calculated based on the weight of all the raw materials added; then a certain amount of mixture was weighed, spread in a press mold, and pressed into a sheet electrode under a pressure of 3 MPa;

Step S130: in the water-free and oxygen-free environment, heat treatment was performed on the pressed sheet electrode at 150° C. for 2 hours to obtain the lithium metal composite electrode.

The manufactured lithium metal composite electrode was assembled into a lithium metal full battery. The lithium metal full battery was assembled using the lithium metal composite electrode in this example as a negative electrode and lithium iron phosphate as a positive electrode. The positive electrode was the same as that in Example 1, and the loading capacity of the lithium iron phosphate in the positive electrode was 8 mg/cm$^2$. The electrolyte was a mixed solution of ethylene carbonate (EC), dimethyl carbonate (DMC), and fluoroethylene carbonate (FEC), including 1M (mol/L) lithium hexafluorophosphate (LiPF$_6$), wherein the volume ratio of EC, DMC and FEC was 45:45:10.

The full batteries in Examples 1-11 and the full battery in Comparative Example 1 were subjected to constant-current charge and discharge tests at a rate of 2C (i.e., 2 Capacity Rate, usually C represents the charge-discharge capacity rate of a battery), and the numbers of cycles were recorded at the moments when the capacity was 98%, 95%, 90%, and 85% and a short circuit occurred. The test results were listed in Table 1.

TABLE 1

| No. | Number of cycles/times | | | | Number of cycles when a short circuit occurs |
|---|---|---|---|---|---|
|  | 98% | 95% | 90% | 85% |  |
| Example 1 | 445 | 500 | 558 | 600 | 650 |
| Example 2 | 439 | 488 | 550 | 580 | 617 |
| Example 3 | 356 | 390 | 455 | 500 | 515 |
| Example 4 | 312 | 335 | 380 | 433 | 456 |
| Example 5 | 403 | 429 | 468 | 527 | 549 |
| Example 6 | 418 | 450 | 500 | 558 | 600 |
| Example 7 | 450 | 525 | 576 | 613 | 645 |
| Example 8 | 448 | 508 | 585 | 607 | 633 |
| Example 9 | 420 | 515 | 552 | 598 | 623 |
| Example 10 | 461 | 518 | 548 | 592 | 647 |
| Example 11 | 312 | 360 | 414 | 451 | 500 |
| Comparative Example 1 | 132 | 148 | 155 | 169 | 173 |

Example 12

A lithium metal composite electrode was prepared from aluminum nitride, lithium metal powder and carbon nanotubes as raw materials by the following steps:

Step S110: in a water-free and oxygen-free environment, aluminum nitride with a particle size of from 1 μm to 2 μm and lithium metal powder with a particle size of from 10 μm to 50 μm were mixed and ground uniformly, wherein in the raw materials, the mass ratio of the aluminum nitride to the lithium metal powder was 1:2;

Step S120: in the water-free and oxygen-free environment, 10% of carbon nanotubes was added to the mixture obtained in step S110, wherein the addition amount of carbon nanotubes was calculated based on the weight of all the raw materials added; then a certain amount of mixture was weighed, spread in a press mold, and pressed into a sheet electrode with a diameter of 11 mm under a pressure of 4 MPa;

Step S130: in the water-free and oxygen-free environment, heat treatment was performed on the pressed sheet electrode at 150° C. for 2 hours to obtain the lithium metal composite electrode.

The manufactured lithium metal composite electrode serving as a negative electrode and polyacrylonitrile sulfide with a loading capacity of 2 mg/cm$^2$ serving as a positive electrode were assembled into a lithium metal battery. The electrolyte was a mixed solution of ethylene carbonate (EC), dimethyl carbonate (DMC), and fluoroethylene carbonate (FEC), including 1M (mol/L) lithium hexafluorophosphate (LiPF$_6$), wherein the volume ratio of EC, DMC and FEC was 45:45:10.

Comparative Example 2

The negative electrode in this comparative example was an ordinary lithium metal sheet, and the other composition was the same as that of the full battery in Example 12. That is, the lithium metal battery used an ordinary lithium metal sheet as the negative electrode and polyacrylonitrile sulfide with a loading capacity of 2 mg/cm$^2$ as the positive electrode. The electrolyte was a mixed solution of ethylene carbonate (EC), dimethyl carbonate (DMC), and fluoroethylene carbonate (FEC), including 1M (mol/L) lithium hexafluorophosphate (LiPF$_6$), wherein the volume ratio of EC, DMC and FEC was 45:45:10.

Figure 8:
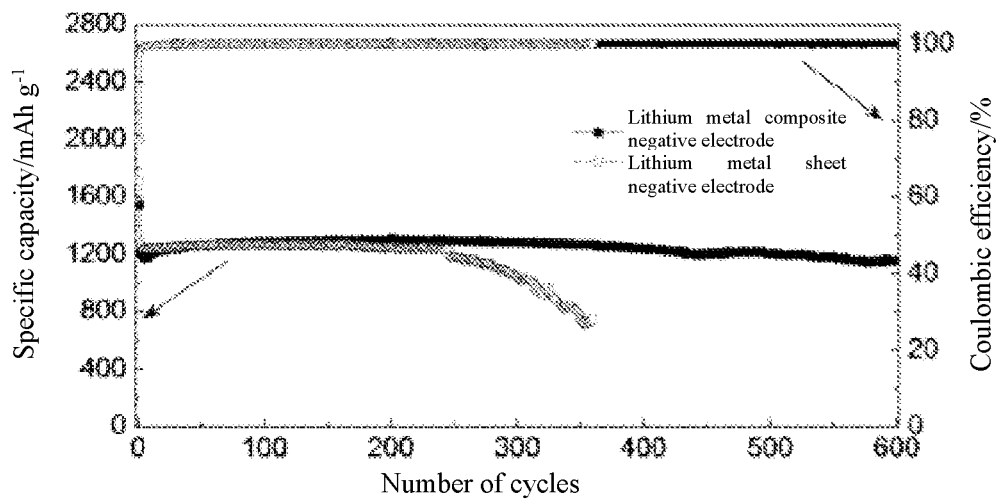
FIG. 8 is a diagram of constant-current charge and discharge cycle curves of lithium metal full batteries in Example 6 and Comparative Example 2.

The constant-current charge and discharge cycle curve of the full battery in Example 12 with the lithium metal composite electrode as a negative electrode and polyacrylonitrile sulfide with a loading capacity of 2 mg/cm$^2$ as a positive electrode at a rate of 1C was shown in FIG. 8a. After 600 cycles, the capacity retention rate was 98%, and no short circuit occurred.

In Comparative Example 2, the ordinary lithium metal sheet was used as a negative electrode, polyacrylonitrile sulfide with a loading capacity of 2 mg/cm$^2$ was used as a positive electrode, then the constant-current charge and discharge cycle curve under the same condition was shown in FIG. 8b, and the capacity retention rate was 58% after 360 cycles.

Based on the above, the present application provides a lithium metal composite electrode material, a method for preparing the same, a lithium metal composite electrode, and a lithium metal battery manufactured using the lithium metal electrode. The lithium metal composite negative electrode material prepared in the present application has a unique three-dimensional framework structure filled with lithium metal particles, the framework structure has lithium-philic characteristic, and the framework retained after the dissolution of lithium metal is porous and is an electron-ion mixed conductor, so the lithium metal can be preferentially deposited in the pores of the framework. The lithium metal composite electrode material prepared by the method inhibits the volume effect of lithium metal and the generation of lithium dendrites, and reduces the consumption of the electrolyte. The cycle stability of the lithium metal composite electrode prepared by the method in the lithium-lithium symmetric battery is greatly improved. Compared with ordinary lithium metal electrodes, the cycle stability of the lithium metal secondary battery using the lithium metal composite electrode as a negative electrode is greatly improved. The method for preparing the lithium metal composite electrode material provided in the present application is easy to operate, and facilitates industrial application.

Described above are merely optional embodiments of the present application, and the present application is not limited thereto. Various modifications and variations may be made to the present application for those skilled in the art. Any modifications, equivalent substitutions, improvements and the like made within the spirit and principle of the present application shall fall within the protection scope of the present application.

Although the embodiments of the present application are described with reference to the alternative embodiments, various improvements can be made and equivalents can be substituted for components therein without departing from the scope of the embodiments of the present application. In particular, as long as there is no structural conflict, various technical features mentioned in the embodiments can be combined in any manner. The embodiments of the present application are not limited to the specific embodiments disclosed herein, but include all technical solutions falling within the scope of the claims.

What is claimed is:

1. A lithium metal composite electrode material for a lithium metal battery, comprising:
   lithium metal particles and a lithium-containing conductive layer serving as a supporting framework, the supporting framework being filled with the lithium metal particles,
   wherein the lithium-containing conductive layer comprises an inorganic lithium compound and a lithium alloy, and
   wherein the lithium alloy is an alloy consisting of lithium and at least one other metal;
   wherein the inorganic lithium compound comprises at least one of lithium nitride, lithium sulfide, or lithium phosphide;
   the at least one other metal in the lithium alloy is at least one selected from Zn, Mg, Ag, Al, Ge, Sn, Sb, In, or Ga;
   wherein the lithium-containing conductive layer includes conductive carbon, and the conductive carbon comprises at least one of carbon nanotubes, carbon fibers, or graphene.

2. The lithium metal composite electrode material according to claim 1, wherein the lithium-containing conductive layer has a mass percentage of from 10% to 20% in the lithium metal composite electrode material.

3. The lithium metal composite electrode material according to claim 1, wherein the conductive carbon has a mass percentage of from 5% to 15% in the lithium metal composite electrode material.

4. A lithium metal composite electrode for a lithium metal battery, comprising the lithium metal composite electrode material according to claim 1.

5. A lithium metal battery, comprising the lithium metal composite electrode according to claim 4.

6. A battery pack, comprising the lithium metal battery according to claim 5.

7. An apparatus using a lithium metal battery as a power source, comprising the battery pack according to claim 6.

8. The apparatus according to claim 7, wherein the apparatus comprises an electric vehicle, a hybrid electric vehicle, a plug-in hybrid electric vehicle, an electric bicycle, an electric scooter, an electric golf cart, an electric truck, an electric ship, or an energy storage system.

9. A method for preparing the lithium metal composite electrode material for a lithium metal battery according to claim 1, comprising the following step of:
   filling the lithium-containing conductive layer serving as the supporting framework with the lithium metal particles, to obtain the lithium metal composite electrode material,
   wherein the lithium-containing conductive layer comprises the inorganic lithium compound and the lithium alloy,
   wherein the lithium alloy is the alloy consisting of lithium and the at least one other metal.

10. The preparation method according to claim 9, comprising the following step:
   growing the lithium-containing conductive layer serving as the supporting framework in situ on surfaces of the lithium metal particles, to obtain the lithium metal composite electrode material;
   under solvent-free and oxygen-free conditions, the lithium metal particles being in contact with a metal compound capable of reacting with lithium, to grow the lithium-containing conductive layer in situ on the surfaces of the lithium metal particles after reaction;
   under solvent-free and oxygen-free conditions, mixing and grinding the lithium metal particles and the metal compound, and then performing heat treatment, to grow the lithium-containing conductive layer on the surfaces of the lithium metal particles in situ;

the metal compound having a mass percentage of from 20% to 50%, relative to a total mass of the lithium metal particles and the metal compound.

11. The preparation method according to claim 10, wherein the lithium metal particles and the metal compound are first mixed and ground, added with the conductive carbon for mixing and grinding, and then subjected to heat treatment, to grow the lithium-containing conductive layer on the surfaces of the lithium metal particles in situ;

the conductive carbon has a mass percentage of from 5% to 15% in the lithium metal composite electrode material;

after mixing and grinding, pressing into a sheet is carried out first, and then the heat treatment is carried out.

12. The preparation method according to claim 10, wherein the metal compound is an inorganic metal compound;

the inorganic metal compound comprises at least one of metal nitride, metal sulfide, or metal phosphide;

the metal in the metal compound is at least one selected from Zn, Ag, Al, Ge, Sn, Sb, In, or Ga;

the metal compound has a particle size of from 50 nm to 2 μm, and the lithium metal particles have a particle size of from 1 μm to 50 μm;

the particle size of the lithium metal particles is at least two times larger than that of the metal compound.

13. The preparation method according to claim 12, wherein the heat treatment is carried out at a temperature of from 100° C. to 300° C. for from 1 h to 2 h;

when the metal compound comprises at least aluminum nitride, the temperature of the heat treatment is from 150° C. to 200° C.

* * * * *

UNITED STATES PATENT AND TRADEMARK OFFICE
CERTIFICATE OF CORRECTION

| | |
|---|---|
| PATENT NO. | : 11,929,509 B2 |
| APPLICATION NO. | : 17/561748 |
| DATED | : March 12, 2024 |
| INVENTOR(S) | : Chengdu Liang et al. |

It is certified that error appears in the above-identified patent and that said Letters Patent is hereby corrected as shown below:

On the Title Page

Item [54] and in the Specification Column 1, Line 1:
Delete "METAL LITHIUM METAL, SUPPORTING FRAMEWORK, AND INORGANIC LITHIUM COMPOUND, METHOD FOR PREPARING THE SAME, AND ELECTRODE, BATTERY, BATTERY MODULE, BATTERY PACK AND APPARATUS COMPRISING THE SAME" and insert --LITHIUM METAL COMPOSITE ELECTRODE MATERIAL INCLUDING LITHIUM METAL, CARBONACEOUS SUPPORTING FRAMEWORK, AND INORGANIC LITHIUM COMPOUND, METHOD FOR PREPARING THE SAME, AND ELECTRODE, BATTERY, BATTERY MODULE, BATTERY PACK AND APPARATUS COMPRISING THE SAME-- therefor.

Signed and Sealed this
Twenty-third Day of April, 2024

Katherine Kelly Vidal
*Director of the United States Patent and Trademark Office*